(12) United States Patent
Garin, Jr. et al.

(10) Patent No.: US 8,868,492 B2
(45) Date of Patent: Oct. 21, 2014

(54) METHOD FOR MAXIMIZING THROUGHPUT AND MINIMIZING TRANSACTIONS RESPONSE TIMES ON THE PRIMARY SYSTEM IN THE PRESENCE OF A ZERO DATA LOSS STANDBY REPLICA

(75) Inventors: Benedicto E. Garin, Jr., Hudson, NH (US); Mahesh B. Girkar, Cupertino, CA (US); Yunrui Li, Fremont, CA (US); Vsevolod Panteleenko, San Mateo, CA (US); Vinay H. Srihari, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 292 days.

(21) Appl. No.: 13/161,315

(22) Filed: Jun. 15, 2011

(65) Prior Publication Data
US 2012/0323849 A1 Dec. 20, 2012

(51) Int. Cl.
*G06F 17/00* (2006.01)
*G06F 17/30* (2006.01)

(52) U.S. Cl.
CPC .............................. *G06F 17/30575* (2013.01)
USPC ........................................... 707/610; 707/617

(58) Field of Classification Search
USPC ........................................ 707/615, 617, 610
See application file for complete search history.

(56) References Cited

U.S. PATENT DOCUMENTS

| | | | |
|---|---|---|---|
| 5,095,421 A | 3/1992 | Freund | |
| 5,241,675 A | 8/1993 | Sheth et al. | |
| 5,263,156 A | 11/1993 | Bowen et al. | |
| 5,287,496 A | 2/1994 | Chen et al. | |
| 5,333,265 A | 7/1994 | Orimo et al. | |
| 5,333,316 A | 7/1994 | Champagne et al. | |
| 5,355,477 A | 10/1994 | Strickland et al. | |
| 5,369,757 A | 11/1994 | Spiro et al. | |
| 5,388,196 A | 2/1995 | Pajak et al. | |
| 5,423,037 A | 6/1995 | Hvasshovd | |

(Continued)

FOREIGN PATENT DOCUMENTS

EP 050180 A 9/1992

OTHER PUBLICATIONS

Teschke, et al., "Concurrent Warehouse Maintenance Without Comprising Session Consistency", 1998, 10 pages.

(Continued)

*Primary Examiner* — Etienne Leroux
*Assistant Examiner* — Fariborz Khoshnoodi
(74) *Attorney, Agent, or Firm* — Hickman Palermo Truong Becker Bingham Wong LLP

(57) ABSTRACT

A method and system is provided for reducing delay to applications connected to a database server that guarantees no data loss during failure or disaster. After storing a log record persistently in a local primary log, the log writer returns control to the application which continues running concurrently with the database server sending the session's log records to a standby database. A separate back channel is used by the standby to communicate, out-of-band to the primary, the location of the last log record stored persistently to the standby log. An application waiting for a transaction to commit may wait until the transaction's commit record has been persisted. Also described is a technique for reducing application delay when there is contention between nodes of a multi-node cluster for updating the same block. The technique provides for an asynchronous ping protocol that guarantees zero data loss during failure or disaster.

24 Claims, 5 Drawing Sheets

(56) References Cited

U.S. PATENT DOCUMENTS

| | | |
|---|---|---|
| 5,454,102 A | 9/1995 | Tang et al. |
| 5,553,279 A | 9/1996 | Goldring |
| 5,555,404 A | 9/1996 | Torbjørnsen et al. |
| 5,559,991 A | 9/1996 | Kanfi |
| 5,574,906 A | 11/1996 | Morris |
| 5,581,753 A | 12/1996 | Terry et al. |
| 5,603,024 A | 2/1997 | Goldring |
| 5,613,113 A | 3/1997 | Goldring |
| 5,806,076 A | 9/1998 | Ngai et al. |
| 5,870,758 A | 2/1999 | Bamford et al. |
| 5,924,096 A | 7/1999 | Draper et al. |
| 5,956,731 A | 9/1999 | Bamford et al. |
| 5,974,427 A | 10/1999 | Reiter |
| 5,983,277 A | 11/1999 | Heile et al. |
| 5,991,771 A | 11/1999 | Falls et al. |
| 6,014,669 A | 1/2000 | Slaughter et al. |
| 6,026,406 A * | 2/2000 | Huang et al. ......................... 1/1 |
| 6,192,377 B1 | 2/2001 | Ganesh et al. |
| 6,298,319 B1 | 10/2001 | Heile et al. |
| 6,353,835 B1 | 3/2002 | Lieuwen |
| 6,393,485 B1 | 5/2002 | Chao et al. |
| 6,516,327 B1 | 2/2003 | Zondervan et al. |
| 6,574,717 B1 | 6/2003 | Ngai et al. |
| 6,691,139 B2 | 2/2004 | Ganesh et al. |
| 6,839,751 B1 | 1/2005 | Dietz et al. |
| 7,024,656 B1 | 4/2006 | Ahad |
| 7,076,508 B2 | 7/2006 | Bourbonnais et al. |
| 7,155,463 B1 | 12/2006 | Wang et al. |
| 7,222,136 B1 | 5/2007 | Brown et al. |
| 7,287,034 B2 | 10/2007 | Wong et al. |
| 7,290,017 B1 | 10/2007 | Wang et al. |
| 7,464,113 B1 | 12/2008 | Girkar et al. |
| 7,627,612 B2 | 12/2009 | Ahal et al. |
| 7,644,084 B2 | 1/2010 | Rapp |
| 7,734,580 B2 | 6/2010 | Lahiri et al. |
| 7,966,293 B1 | 6/2011 | Owara et al. |
| 8,468,320 B1 | 6/2013 | Stringham |
| 2002/0133508 A1 | 9/2002 | LaRue et al. |
| 2002/0165724 A1 | 11/2002 | Blankesteijn |
| 2006/0004691 A1 | 1/2006 | Sifry |
| 2006/0212481 A1 | 9/2006 | Stacey et al. |
| 2007/0038689 A1 | 2/2007 | Shinkai |
| 2007/0083505 A1 | 4/2007 | Ferrari et al. |
| 2007/0226277 A1 | 9/2007 | Holenstein et al. |
| 2008/0126846 A1 * | 5/2008 | Vivian et al. ...................... 714/6 |
| 2008/0228835 A1 | 9/2008 | Lashley et al. |
| 2008/0256143 A1 | 10/2008 | Reddy et al. |
| 2009/0268903 A1 | 10/2009 | Bojinov et al. |
| 2010/0036843 A1 | 2/2010 | MacNaughton et al. |
| 2010/0145909 A1 | 6/2010 | Ngo |
| 2011/0087637 A1 | 4/2011 | Sundaram et al. |
| 2011/0145207 A1 | 6/2011 | Agrawal et al. |
| 2011/0231362 A1 | 9/2011 | Attarde et al. |
| 2012/0054158 A1 | 3/2012 | Hu et al. |
| 2012/0054533 A1 | 3/2012 | Shi et al. |
| 2014/0059020 A1 | 2/2014 | Hu et al. |

OTHER PUBLICATIONS

Vassilakis et al., "Implementation of Transaction and Concurrency Control Support in a Temporal DBMS" Information Systems, vol. 23, No. 5, 1998, 16 pages.

Bober et al., "On Mixing Queries and Transactions Via Multiversion Locking", IEEE, 1992, 11 pages.

Mohan et al., "Efficient and Flexible Methods for Transient Versioning of Records to Avoid Locking by Reading-Only Transactions", XP 000393583, IBM Almaden Research Center, Dated Feb. 6, 1992, 11 pages.

* cited by examiner

METHOD FOR MAXIMIZING THROUGHPUT AND MINIMIZING TRANSACTIONS RESPONSE TIMES ON THE PRIMARY SYSTEM IN THE PRESENCE OF A ZERO DATA LOSS STANDBY REPLICA

CROSS-REFERENCE TO RELATED APPLICATIONS

This application is related to the following, the entire contents of which are hereby incorporated by reference for all purposes as if fully set forth herein: "Readable Physical Storage Replica and Standby Database System" U.S. patent application Ser. No. 11/818,975 (now issued as U.S. Pat. No. 7,734,580), filed Jan. 29, 2007; "Consistent Read in a Distributed Database Environment" U.S. patent application Ser. No. 10/119,672 (issued as U.S. Pat. No. 7,334,004) filed Apr. 9, 2002; "Reduced Disk Space Standby" U.S. patent application Ser. No. 12/871,795 filed Aug. 30, 2010; and "Controlling Data Lag in a Replicated Computer System" U.S. patent application Ser. No. 12/871,805, filed Aug. 30, 2010.

FIELD OF THE INVENTION

The present invention relates to real-time replication of data in a distributed system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In a procedure referred to as data replication, modern enterprises replicate data that is primarily updated and/or accessed at a storage system, referred to herein as a "primary data system" ("primary system" or "primary"). Data is replicated or duplicated at another storage system or location, referred to herein as "replica data system" ("standby system" or "standby"). The data stored at the primary system is referred to herein as primary data or a primary copy and the data stored at the replica system is referred to as replica data or a replica copy.

Database systems (DBMSs) are often protected using replication. Typically, one DBMS maintains the primary copy of database files and one or more other database systems referred to herein as a standby system, each maintains a replica of the database files of the primary copy. The standby database system is used to back up (or mirror) information stored in the primary database system or other primary copy.

For a DBMS protected using replication, data files, redo log files, and control files are stored in separate, logically or physically identical images on separate physical media. In the event of a failure of the primary database system, the information is preserved, in duplicate, on the standby database system, which can be used in place of the primary database system.

The standby database system is kept up to date to accurately and timely reproduce the information in the primary database system. Typically, redo log records (also referred to herein as "redo records" or more generally as "change records") are transmitted automatically from the primary database system to the standby database system. Information from the redo logs regarding changes that were made on the primary database system are used to replicate changes to the standby database system.

There are two types of standby database systems, a physical standby database system and logical standby database systems, which differ in the way they replicate information. In a logical replication system, operations performed on the primary system are sent to the standby system, and these operations are then performed again on the standby system. Thus, the standby system need only be logically identical, but not physically identical.

In a physical standby database system, changes are made using physical replication. For physical replication, updates made to a data unit of contiguous storage (herein "data blocks") at the primary database system are made to corresponding data block replicas stored at the replica system. In the context of database systems, changes made to data blocks on the primary database system are replicated in replicas of those data blocks on the physical standby database system.

A data block is an atomic unit of persistent contiguous storage used by a DBMS to store database records (e.g. rows of a table). Information stored on the primary database system is thus replicated at the lowest atomic level of database storage space and a physical standby database system is essentially a physical replica of the primary database system. When records are read from persistent storage, a data block containing the record is copied into a buffer of DBMS's buffering system. The database and/or the buffer usually contains other rows and control and formatting information (e.g., offsets to sequences of bytes representing rows or other data structures, lists of transactions affecting rows). To read one record, the entire data block in which the row is stored must be read into the buffer.

To replicate changes from the primary database system, the primary database system scans the redo records and transmits them to the standby database system. Redo records record changes to data blocks between a previous version of a data block and a subsequent version of the data block. A redo record contains enough information to reproduce the change to a copy of the previous version. Storing a redo record to persistent storage is part of an operation referred to herein as "persisting" the redo/change record. Persisting the change record on the standby database system ensures that the change record itself is not lost if the standby database system should restart. Updating the data block is performed as a separate process. To update the state of the data, the information contained within a redo record is used to reproduce a change to the previous version of the data block to produce the subsequent version of the data block. Updating the contents of the data block in this way is an operation referred to herein as applying the redo record.

Multi-Node Database Systems

High availability in terms of reliability and performance may also be provided by fault tolerance mechanisms and replication built into a multi-node system. A multi-node database system is made up of interconnected nodes that share access to resources. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network.

Each node in a multi-node database system may host a database server. A server, such as a database server (also referred to as a "database server instance" herein), is a combination of integrated software components and an allocation of computational resources, such as memory, a node, and processes on the node for executing the integrated software components on a processor, the combination of the software and computational resources being dedicated to performing a particular function on behalf of one or more clients. Among other functions of database management, a database server governs and facilitates access to particular database storage, processing requests by clients to access data stored in the database.

Resources from multiple nodes in a multi-node database system can be allocated to running a particular database server's software. Each combination of the software and allocation of the resources from a node is a server that is referred to herein as a "server instance" or "instance".

Database Applications

A database application executes a computer program that includes database commands. A database application connects to a database server instance and sends database commands to the database server instance. A transaction is a set of operations that are executed as an atomic unit (must all succeed or fail together). A transaction is said to commit when all the operations in the transaction succeed together. A transaction aborts when all operations fail together. Operations executed in the application following the commit of a transaction often depend on whether the transaction committed or aborted. Thus, when an application sends a database command to commit a transaction, the application may wait for the database service instance to indicate a successful transaction commit before continuing to execute subsequent operations. Thus, the performance of a database application may depend on the time it takes the database server instance to perform a transaction commit.

When the database system guarantees no loss of data even in the event of a catastrophic failure of the primary node, a transaction commit may take considerable time. Such a guarantee requires that change records generated by a transaction have been persisted to the redo log at the Primary and redo log at the Standby before acknowledging to the session that the commit is completed. It is not necessary or required to wait for the actual data blocks to get updated. After the commit has been acknowledged as such, the next application operation of the session can be executed. When the standby is geographically remote, the latency for receiving the acknowledgement from the standby that the change records have been persisted will result in slow application performance.

When a database server receives a database command from an application, the application is associated with a database session that performs work on behalf of the application on the database server. An application can be represented by a single session on a single database server instance, or the work of performing the requested database command may be split across a plurality of cooperating sessions running on separate nodes in a multi-node system. Thus, operations belonging to the same transaction may be performed by a plurality of database server instances residing on different nodes.

Another source of poor application performance may be contention for updating the same data block across primary nodes of a multi-node system. The block may be updated in the context of the same application transaction or completely independent applications may be updating the same block. Completely independent applications updating the same block can occur if the block contains multiple rows, and each session is updating a different row. Whenever multiple instances update the same block, the locking protocol must be observed. When a lock on a particular block is relinquished, and ownership transferred to a session on another node, changes made by the previous lock holder must be stored persistently in the log so that they are applied to the data block before subsequent changes made by the new lock owner. In the presence of a standby that is supporting zero data loss guarantees, both the lock requester and the lock holder are required to wait for the lock holder's changes to be stored persistently at the standby system before transferring ownership to the lock Requester. Application delay can occur whenever ownership of a block is transferred from one node to another node.

Described herein are techniques for increasing application performance while guaranteeing no loss of data in the event of a catastrophic primary system failure.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
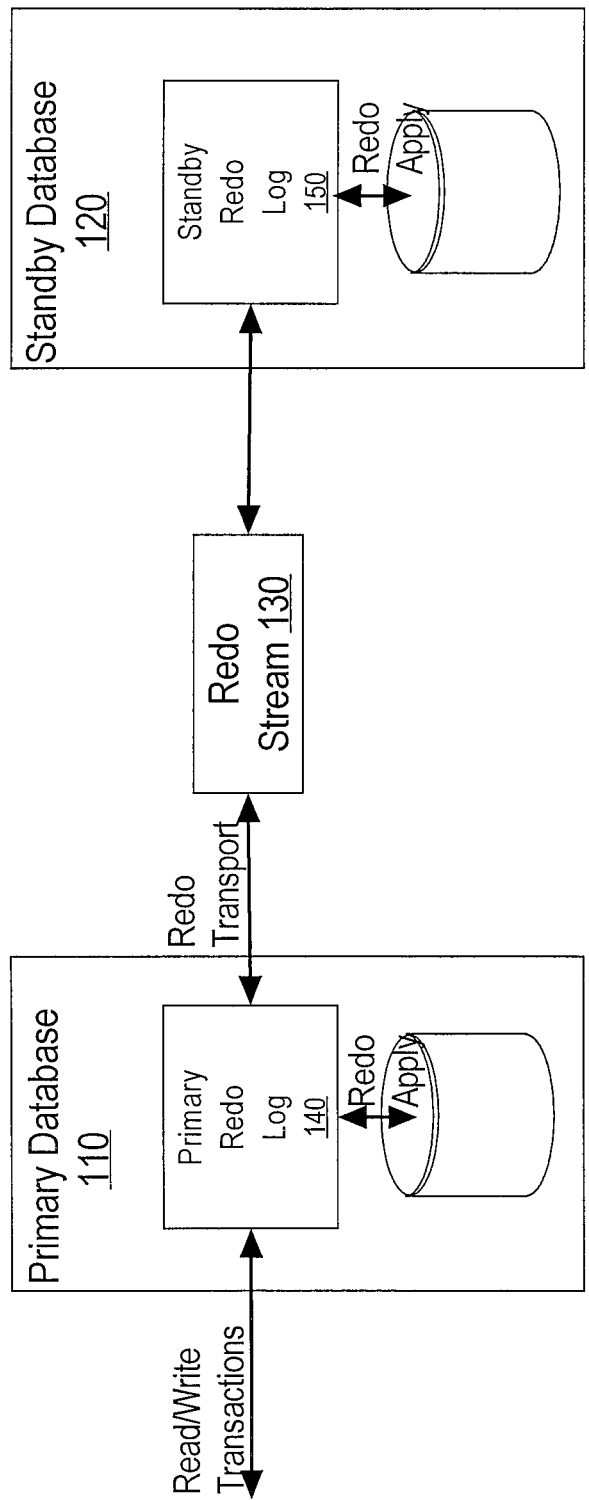
FIG. 1 is a block diagram illustrating replication of a database system, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Replicating data between a source of data files, herein referred to as a "primary" system and a replica of the data files, herein referred to as a "standby" or "secondary" system, may be performed to ensure that no committed data is lost in the presence of a failure. If a primary system experiences a failure from which recovery is not possible, a standby system has all of the data necessary to recreate the committed state of the primary at the time of the failure. To ensure that all data is stored persistently to a standby system before advancing to the next state, the primary and standby systems may be synchronized. When an application commits a transaction, the application is delayed from continuing to execute subsequent operations until the change records of the committed transaction are replicated on the standby system before continuing. Techniques described herein are directed to increasing performance of an application by reducing the time to synchronize the primary and standby database systems.

Another source of application delay is contention for the same data block across primary nodes of a multi-node system. A node with a write lock on a block is called the "Holder" herein, and a node requesting to change that same block is called the "Requester" herein. In response to a Requester requesting write access to a block owned by the Holder, the Holder first persistently stores to the local redo log changes that the Holder has made. In a system using a synchronous replication protocol, the Holder waits until the changes have been stored persistently on a standby system before proceeding. Once the Holder receives an acknowledgement that the redo changes to the block are stored persistently on the standby system, the Holder may then transfer the requested block and ownership of the block to the Requester, which then becomes the new Holder of the block. Every time the owner of a block switches from one node to another, both the Requester and the Holder wait until the Holder's changes are stored persistently on the standby system before proceeding, which negatively impacts the performance of both the Holder and the Requester. Techniques described herein are directed to reducing the time that Requester and Holder must wait to transfer control of a block.

The techniques described herein are described with respect to a database system, although the techniques are applicable to different types of systems that store and retrieve data in response to application requests. In an embodiment, a database system receives queries from applications and executes transactions. Transactional consistency is very important to the proper functioning of a database system. In another embodiment, a data storage system such as a file system may use these techniques, although the language used to describe the operations performed by a data storage system may be different than for a database system. For example, even if a file system does not support transactional semantics, changes made to the file system may be sent from a primary file system to a standby file system in the form of change records that are stored persistently in a log, then the changes specified in the change records may be applied to the data in the file system.

Example DBMS Environment

FIG. 1 depicts a primary and standby database system according to an embodiment of the present invention. Standby Database System 120 is a replica database system for Primary Database System 110. Primary Database System 110 has a log in which are stored a record of operations performed in the database system, including records of changes to data blocks and transaction commits, that have an impact on persistent data blocks. The log is also referred to herein as a "redo log" and the records stored in the log as "redo records" because each record provides instructions for recreating the effect of an operation on a block. The term "redo" is a shorthand expression used synonymously herein with "redo records", and "log" is a shorthand expression used synonymously herein with "redo log."

Standby Database System 120 also has at least one dedicated redo log corresponding to each database server instance comprising Primary Database System 110. That is, each redo log on Standby Database System 120 contains redo records for only one primary database instance. Log records from Primary Redo Log 140 (also referred to as the "local log" herein) of Primary Database System 110, are received by Standby Database System 120 in a stream of redo records (Redo Stream 130), which writes the redo records to Standby Redo Log 150. Then instructions in the redo records are applied to the data blocks. For example, for a change redo record, the changes represented by the redo records are then applied to data blocks of the database files managed by Standby Database System 120. Redo log records are stored in the redo log (persistent storage) in the order that the redo log records were generated on the Primary Database System 110. Redo records are applied to the data blocks in the relative order in which the records occur within a single redo stream. A sequence number in each log record enables merging of redo records across multiple logs (i.e. one redo log for each primary database instance).

Redo log records include other kinds of records other than data block change records. For example, a redo record may include a commit record, which is generated when a transaction is committed. The redo change records for a transaction occur earlier in order in the redo log and redo stream than a commit record for that transaction.

As transactions are committed by a database system, the database system transitions from one transactional consistent state to another transactional consistent state. A transactional consistent state is one in which the database system responds to queries with data that reflects all changes made by committed transactions and none of the changes made by the uncommitted transactions. In one embodiment, a sequence number in each log record may reflect the transactional state that the record belongs to.

Synchronization May Cause Application Delay

When a database operation commits a transaction, a log writer at the primary system generates a redo record corresponding to the commit. The log writer first writes the redo record to the primary database server's (abbreviated herein to "primary") redo log, and sends the redo record as part of the redo stream to the standby database server (abbreviated herein as "standby"). A process running on the standby receives the redo stream, writes the redo records from the stream into the standby redo log, and waits until these records are stored persistently to non-volatile storage before responding back to the primary. Upon receiving the response indicating that the commit redo record is persistently stored, the application session running on the primary is allowed to continue executing subsequent instructions.

The primary's log writer packages together multiple redo records in the stream, sends the package of redo records together to the standby system, and the standby system acknowledges the persistence of all of the redo records that were sent together in the same package. The redo records in a package may represent changes to different data blocks across many different applications. Thus, each application waits when committing a transaction while the change records associated with the transaction are stored persistently at the standby.

Bottleneck at the Log Writer

Because the log writer waits until the last sent redo package is acknowledged as having been stored persistently on the standby before sending the next redo package, the log writer is a synchronization point between the primary and standby systems. Applications creating redo records can execute concurrently with each other and with the log writer until an application must wait on a shared resource. For example, in a system with limited buffer space, the log writer may tie up buffer space that holds queued redo records waiting to be sent to the standby. Eventually, when an application tries to create a new redo record, the application may be blocked waiting for a buffer to become available. An application may have to wait for the log writer to free buffer space before the application can generate more redo and continue executing. Also, when an application commits a transaction, the application may not continue executing until the commit is acknowledged by the standby system. The application must wait for the commit record to be sent to the standby, received by the standby, persisted, and acknowledged by the standby. Thus, an application is blocked from executing while the commit redo record is queued waiting to be sent to the standby behind previously-written redo records. The buffers used to hold queued redo records for the log writer, and the redo records awaiting acknowledgement from the standby, may be redo records from a single application. Thus, the performance of the log writer bottleneck can negatively impact performance even when there is only a single application generating redo records.

However, in a system where there are multiple applications running concurrently, the log writer is a critical resource shared among the applications. As a result of applications blocking on shared log writer resources, the log writer may serialize applications that could otherwise run concurrently. For example, Application A commits a transaction, and a transaction commit redo record is generated. Running concurrently, Application B changes a block not being used by Application A. Application B's change redo record is written to the primary log, packaged with other redo records, and sent to the standby. Immediately after, Application A's commit redo record is stored persistently in the primary log, but the log writer has already sent the package with Application B's redo. Application A's redo record is packaged with another set of redo records. Application A blocks waiting for notification that the transaction has committed. However, Application A's redo cannot even be sent to the standby until the log writer receives notification that the first package (that includes Application B's redo) has been stored persistently. Application A waits with no work performed on its behalf while other application's redo is stored persistently at the standby and the log writer receives notification that it is safe to send the next package of redo records that includes Application A's commit redo record.

Thus, the performance of the log writer itself impacts the performance of the applications that depend on it. The longer it takes the log writer to send a redo package, the longer the log writer holds onto potentially constrained buffer space. Also, the delay in receiving an acknowledgement back from the standby causes an application to wait for transactions to commit.

Reducing Application Delay

An approach that may be used to reduce the delay experienced by applications is for the primary's log writer to continuously send redo records without waiting for acknowledgements from the standby. The standby may send status notifications that indicate which redo records have been persisted. The size, structure, and content of the standby log may be identical to the primary log. Thus, the location of a particular log record already stored persistently in the local log may be stored at the same location in the standby log. A primary can determine which redo records have been made persistent on the standby by knowing the position in the standby log that has been most recently written. All log records in the primary log up to the position most recently written to the standby log have been persistently stored. Thus, a notification from the standby may indicate a location in the standby log of the last record that was stored persistently. In an alternate embodiment, a status notification may include an identifier that identifies the last redo record stored persistently in the log.

Committing a Transaction

When an application session commits a transaction, the session cannot process further instructions until the session receives notification that the transaction has fully committed. The transaction is not fully committed until the transaction's commit log record has been stored persistently at the primary and standby servers to ensure durability of the transaction. From the primary's perspective, the transaction is not committed until the primary receives the commitment acknowledgement.

Figure 2:
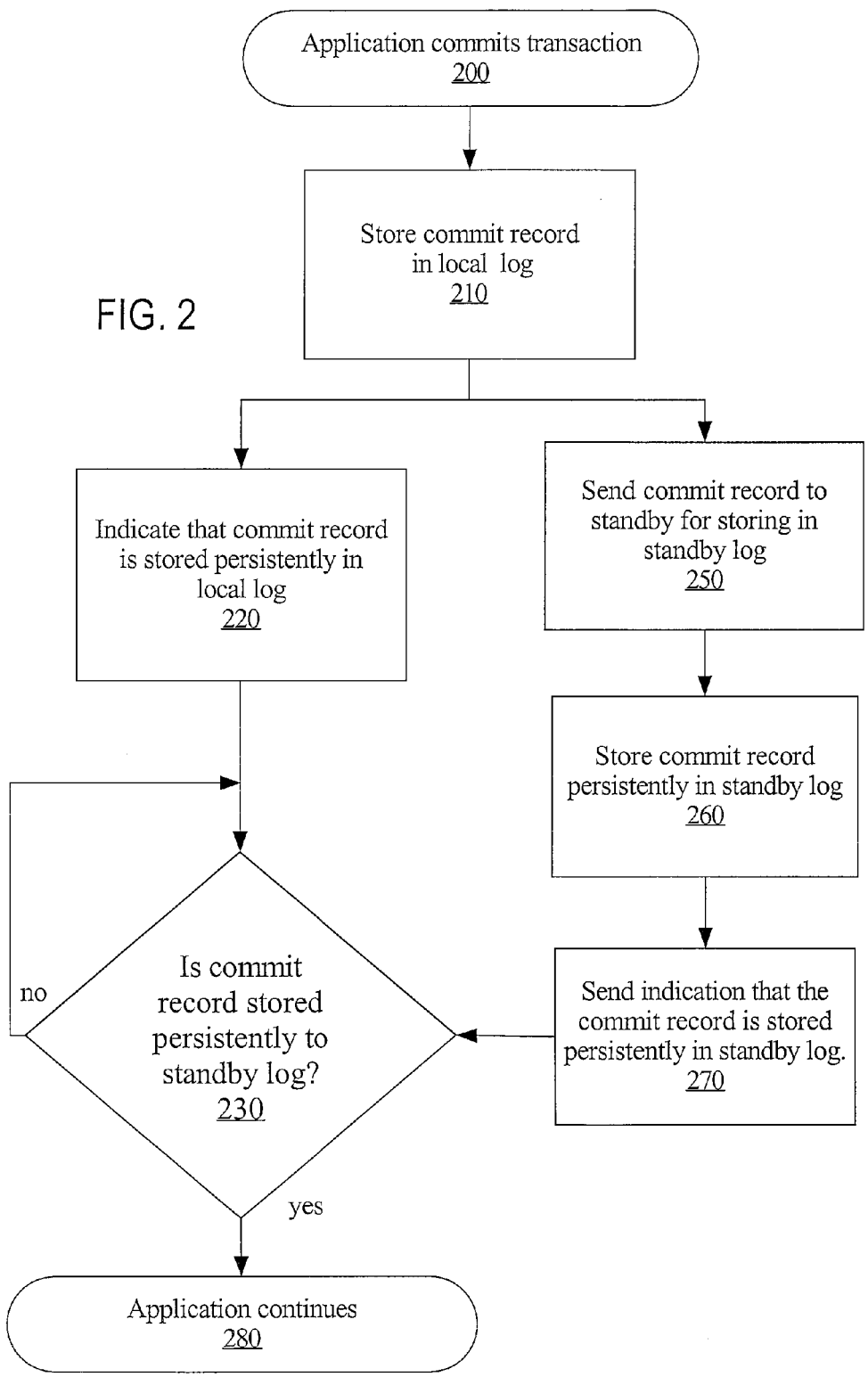
FIG. 2 shows a flow diagram illustrating replicating a transaction commit operation, according to an embodiment of the invention.

FIG. 2 shows a flow diagram illustrating replicating transaction commit, according to an embodiment of the invention. In Step 200, a session commits a transaction, then blocks waiting for the transaction to fully commit. In Step 210, a commit log record is generated and stored persistently in the primary's local redo log. In Step 220, the session is notified that the commit record is stored persistently in the local log. The notification may include the position within the standby log of the last redo record stored. At Step 230, the session waits for notification that the commit record is stored persistently in the standby log. Determining that a commit record is stored persistently in the standby log can be performed by comparing the location of the last record persisted in the standby log to the location of the commit record in the primary log. Concurrently with Steps 220 and 230, the primary's log writer may send the session's commit record in the redo stream to the standby in Step 250. In Step 260, the standby stores the commit record persistently to the standby redo log. In Step 270, the standby sends an indication that the commit record is stored persistently at the standby.

Once the notification is received that indicates that the commit records are stored persistently at the standby, the decision at step 230 will proceed to 280, and the application may continue executing further instructions.

Separate Forward and Backward Channels

One approach to avoiding the log writer bottleneck described above is to separate the redo stream from the notification stream, allowing application sessions generating redo records to operate more concurrently. In an embodiment, the same connection may be shared between sending the redo stream and sending status notifications between a primary node and its standby node. In an alternate embodiment, communications between the primary and the standby may be split into two separate channels or connections. The forward channel is used by the primary's log writer to send a potentially continuous redo stream to the standby without waiting for responses. That is, after one package of redo is sent, another can be sent before the first package is stored persistently at the standby database. The back channel may be used for out-of-band communication between a notifier generation process separate from a redo receiver process on the standby and a new notifier receiver process that is separate from the log writer on the primary. Status notifications may be sent providing information about the persistence of particular log records in the standby log.

In the example above, by using separate forward and backward channels, Application A would not be required to wait for other applications' redo to be sent, stored persistently, and acknowledged before Application A's redo is sent to the standby. Having a dedicated forward channel for redo records means that Application A's commit record may be sent as soon as the commit record arrives at the log writer, even if no acknowledgement has been received for redo records ahead of Application A's redo record in the stream. Concurrent with a standby receiver process receiving incoming redo records, the notifier generation process sends notifications of standby log status back on the back channel where it may be received by a dedicated process that causes a waiting application, like Application A, to determine that their transaction has committed. Thus, one Application's redo stream has minimal affect on the delay experienced by another application.

One way of communicating log record status is to include in the notification message the location in the standby log the last record persistently stored. In an embodiment, the location of a redo record in a log may be expressed as a block number offset from the beginning of the log.

Detailed Example

Figure 3:
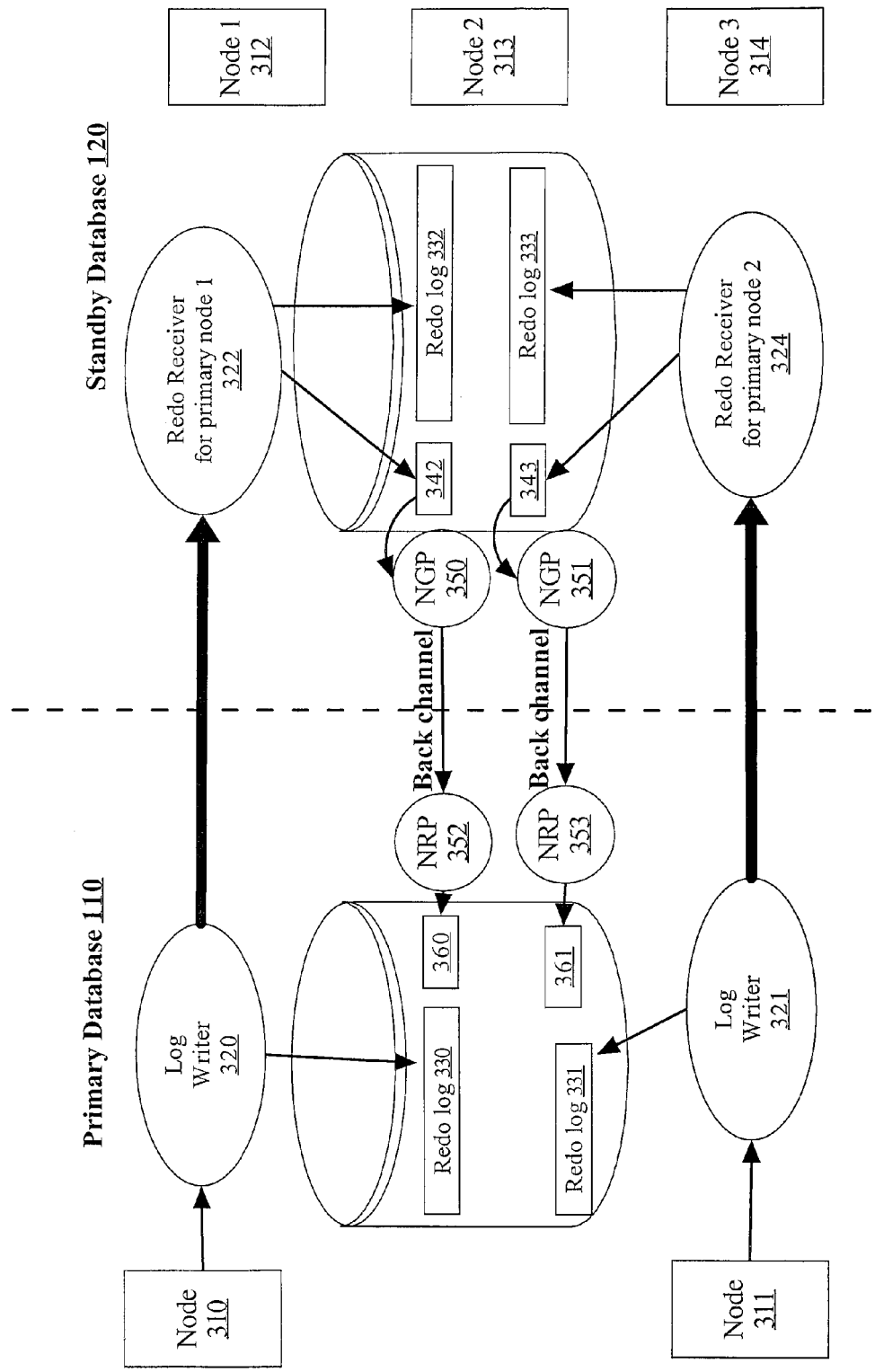
FIG. 3 shows a diagram illustrating the synchronization of redo logs between a primary database system and a standby database system.

FIG. 3 shows a diagram illustrating the synchronization of redo logs between a primary database system and a standby database system. Primary Database System 110 has two nodes, Node 310 and Node 311 that send block changes to each of their respective Log Writers 320 and 321, respectively. Log Writer 320 writes redo records to the local Primary Redo Log 330. Similarly, Log Writer 321 on Node 311 writes changes to the Redo Log 331 that is local to node 311.

Each log writer process sends a redo stream to its corresponding redo receiver process on the standby node. Thus, Log Writer 320 sends a redo stream to Redo Receiver 322, and Log Writer 321 sends a redo stream to Redo Receiver 324. The thick arrow between log writers and redo receiver processes representing the path of the redo stream is intended to illustrate that the redo stream may be transmitted with increased bandwidth. That is, more data per unit time can be sent between log writers and redo receivers because the communication is not throttled waiting for acknowledgements. Each redo receiver process writes the redo records to its respective redo log on the standby system. Thus, Redo Receiver 322 writes to Redo Log 332 and Redo Receiver 324 writes to Redo Log 333. Redo Receiver processes 322 and 324 also update the values of the corresponding last block number (342 and 343 respectively) stored persistently in the corresponding standby redo log. Notification of a particular redo record being stored persistently may be triggered by updating the value in one of 342 or 343.

In an embodiment, Notifier Generation Processes (NGP) 350 and 351 send a notification message that includes the contents of Last Standby Block Number Updated 342 and 343 on the back channel to processes Notifier Receiver Processes (NRP) 352 and 353 respectively running on the primary nodes. That is, the back channel provides out-of-band communication between the standby and the primary nodes. NRP 352 and 353 may update the value of their respective local copy of the Last Standby Block Number Updated (360 or 361). A session waiting for a transaction to commit may monitor the value of their respective Last Standby Block Number Updated (360 or 361) to determine whether the commit record has been stored persistently on the standby.

Reducing Time to Transfer Block Ownership Between Nodes

When a block of a shared database is updated by more than one node, a process referred to herein as a "ping" is performed for transferring ownership from one node to another. A ping comprises a three step process: (1) one node (called a "Requester" herein) requests to make a change to a block of data currently owned by another node (called a "Holder" herein) of the multi-node database system, (2) changes that were made by the Holder are stored persistently, and (3) the block is transferred from the Holder to the Requester.

If the Holder transfers ownership of the block before changes made to the block by the Holder are persisted to the Holder's standby, there could be a race between the Holder's redo and the Requester's redo arriving at the standby system. If the Requester's redo arrives first and commits a transaction that depends on the changes made by the Holder, the Holder's changes may be lost. However, requiring transfer of ownership to wait until the Holder's redo is stored persistently at the standby causes both the Holder and the Requester to wait. This wait would be required every time the ownership for a block changed. However, integrity of the data only requires that the changes made to the block by the Holder be stored persistently before committing any transaction that depends on those changes. Thus, the synchronization point may be delayed until a commit record is received at the standby from the Requester with respect to the requested block. Delaying the synchronization point allows the former Holder of the block to continue executing rather than waiting for an acknowledgement from the standby system before completing the ping operation.

Figure 4:
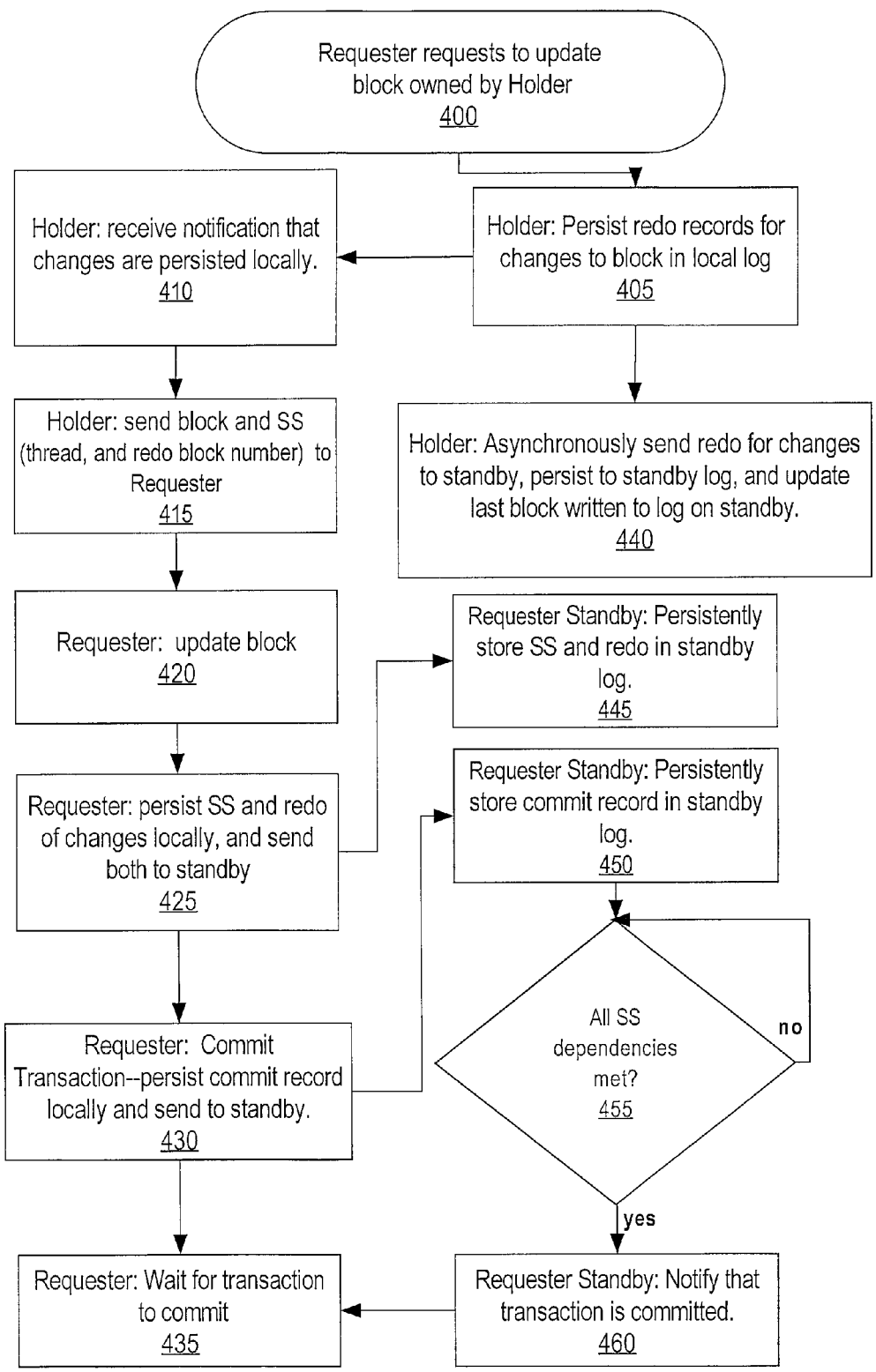
FIG. 4 shows a flow diagram that illustrates delayed synchronization between two nodes making changes to the same block of data.

In one embodiment, a redo record type referred to herein as a synchronization structure ("SS") is used to synchronize writing to the standby log so that a transaction will not commit and changes will not be applied to data blocks until all dependencies of one set of changes on another set of changes have been met. FIG. 4 shows a flow diagram that illustrates delaying the synchronization point between two nodes making changes to the same block of data. The process starts in response to a Requester requesting to change a block that is currently owned by a Holder, shown as 400. Alternatively, the Holder and the Requester may be executing different transactions that require data that happens to be stored in the same data block, for example, operating on data in different rows in the same table. In 405, log records representing changes made by the Holder to the requested block that have not already been stored persistently are generated and stored to the local redo log on the Holder's node. After the redo records are stored persistently in the Holder's local redo log, completing the ping operation may be performed concurrently with storing these redo records at the Holder's standby.

In Step 410, the Holder is informed that the changes have been stored persistently in the local log, and the Holder is allowed to continue executing the ping operation. The Holder may receive information regarding the location in the local log where the last redo record for the Holder's changes to the block are located. In Step 415, the Holder sends the requested block and a SS structure to the Requester. A SS is a data structure that contains information that identifies the Holder and the location in the Holder's local redo log received from the log writer. The SS structure itself is treated as a redo record. Once the SS record is stored persistently in the Requester's local log, the ping operation is complete. In an embodiment, the SS record may be persistently stored to the local log immediately upon receipt. In an alternate embodiment, the SS record may be written to the local log together with other redo records generated by the Requester when updating the block.

In Step 420, the Requester makes changes to the block. In Step 425, the SS record together with redo records for the block changes are stored persistently in the local Requester's primary redo log and sent to the Requester's standby. The Requester's local redo log is separate from the Holder's local redo log because the Requester and the Holder are on different nodes of the primary. The Holder's standby redo log is also separate from the Requester's standby redo log because the Holder's standby is a different node than the Requester's standby node in the secondary system. The Requester can continue executing and making updates to the block, storing the changes locally, and sending the changes to the standby in the usual manner. In Step 430, the Requester commits a transaction, and in Step 435, the Requester waits for the transaction to commit on the standby.

While the Holder and Requester complete the ping operation, the appropriate redo records from the Holder on the requested block are sent to the Holder's standby in Step 440 to store the redo records in the Holder's standby log. In other words, the Holder and Requester need not wait for the Holder's changes to be persisted at the Holder's standby before completing the ping operation. After the Holder's redo records are stored in the standby log, the Holder's standby node may notify other standby nodes with information regarding the state of the Holder's redo records. In an embodiment, the state may be expressed as a block number offset from the beginning of the log of the last written redo record.

In Step 445, in response to receiving the redo records generated and sent in Step 425, the Requester's standby stores the SS record and accompanying redo records persistently in the Requester's standby log. In Step 450, the standby receives and writes the Requester's commit record generated and sent in Step 430. In Step 455, upon detecting that a SS record was received, the standby redo receiver process 324 looks inside the SS record to retrieve the Holder information that is used to identify the Holder's standby log and the location that indicates where within the Holder's standby log the last redo record for updates to the requested block is expected to be stored. The Requester's standby process 324 receiving the Requester's change records compares the location information from the SS record to the location of the last record written to the Holder's standby log 342 to determine if the dependency indicated in the SS is satisfied. If the location of the last record written to the Holder's standby log is beyond the location identified in the SS record, then the dependency is met, and a notification is sent announcing the location of the last redo record that was written to the Requester's redo log. This notification serves to notify the Requester's primary node that the transaction has committed (Step 460).

If the last record written to the Holder's standby log is not beyond the location identified in the SS record, then the dependency is not met, and no notification is generated. The standby waits in Step 455 until the dependency is met. That is, the Requester's standby waits until it receives an indication from the Holder's standby receiver process 322 that the Holder's standby has written redo records at or beyond the location identified in the SS. This ensures that all of the updates and dependencies needed for the Requester's transaction to commit have been stored persistently. Most of the time, the changes from the Holder are stored persistently before redo from the Requester is streamed to the standby. However, the use of the SS structure ensures correct behavior in case the Requester's redo wins the race to the standby.

Terminal Recovery

In the event that the primary system crashes catastrophically and failure recovery cannot be performed, terminal recovery is performed at the standby system, and the standby system becomes the new primary system. Terminal recovery re-creates the state of the primary node at the time of the crash based on the information stored in the standby redo logs associated with each of the nodes. The redo logs are merged based on a sequence number within the redo records generated by Primary nodes to ensure that the changes are applied to the blocks in the same order that they were originally made on the primary system.

If there are no outstanding (i.e. unsatisfied) SS dependencies at the time of the crash, terminal recovery can proceed as normal. First the instructions from all persisted redo records are applied to the disc blocks. Then, uncommitted changes are rolled back. However, it is possible for the primary to crash between storing an SS record persistently and writing the redo records on which the SS depends. For example, the SS record could be written to the Requester's standby redo log, and then the primary may crash before the Holder's changes are written to the Holder's standby log. The terminal recovery process may detect the presence of a SS record, and if the dependency indicated by the SS record is not met, log recovery can stop without further processing. Even if a commit record had been persisted in the standby log after the SS record was written, if the SS dependency had not been met, the Requester's primary would not have received an acknowledgement that the transaction was committed. Thus, log records after the SS in the redo log should not be applied. Therefore, the terminal recovery process can complete sooner by eliminating the unnecessary work of applying then rolling back changes recorded after the SS record.

Equivalents, Extensions, Alternatives & Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
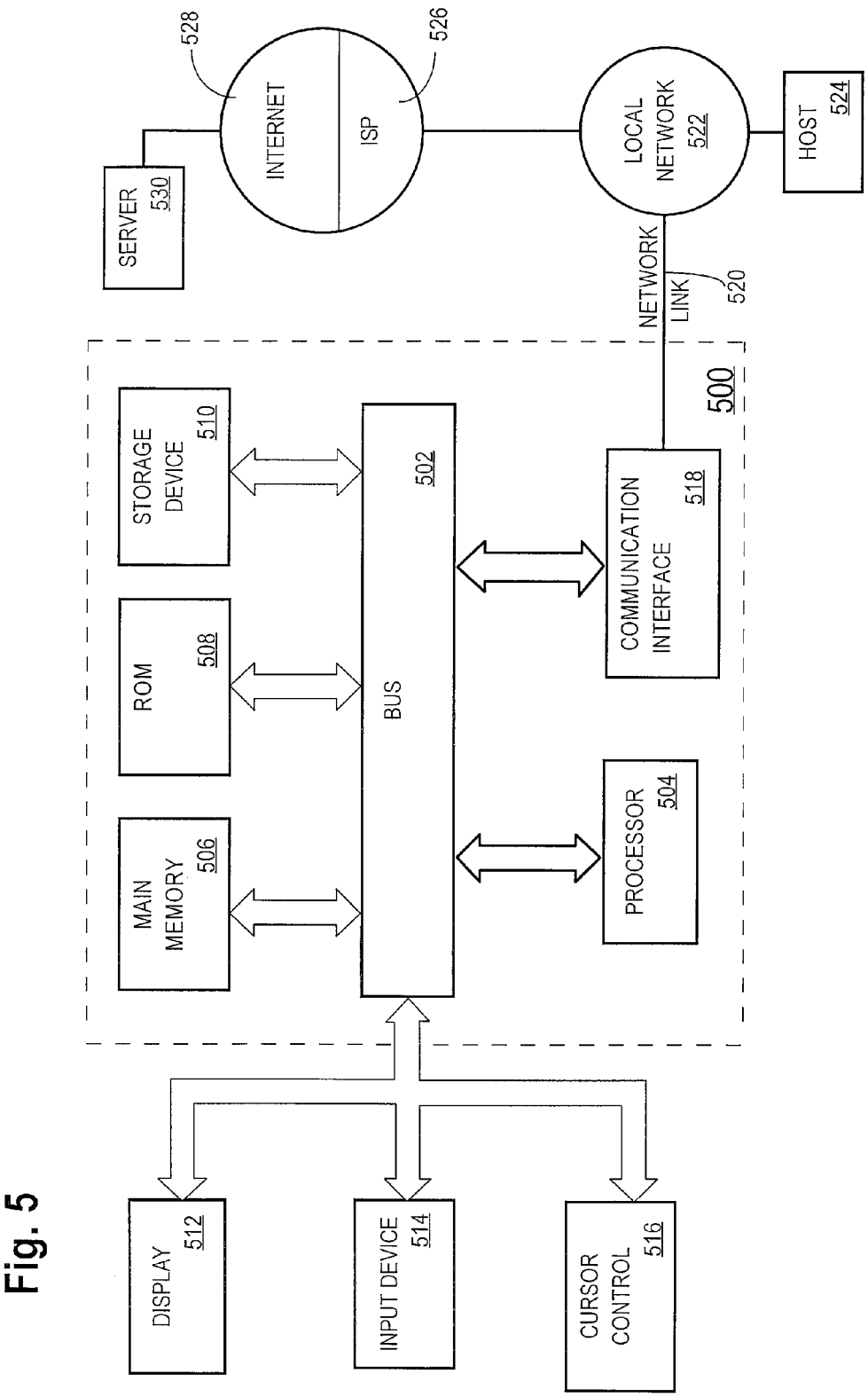
FIG. 5 is a block diagram that illustrates a computer system upon which an embodiment in accordance with the present invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for synchronizing a commit of a same transaction at both a primary database server and a secondary database server that replicates transactions made at the primary database server, comprising steps of:
   via a forward channel to said secondary database server, said primary database server transmitting, to said secondary database server for replication, log records recording changes made by said transactions;
   said primary database server persistently storing in a first persistent log a commit record recording a commitment of a transaction of said transactions;
   via said forward channel to said secondary database server, a first process executing at said primary database server transmitting said commit record to said secondary database server;
   via a back channel that is different than said forward channel, a second process that is different than the first process and that is executing at said primary database server receiving, from the secondary database server, an indication that said secondary database server has persistently stored said commit record in a second persistent log;
   in response to (1) receiving said indication that said secondary database server has persistently stored said commit record in said second persistent log and (2) said primary database server persistently storing said commit record in the first persistent log, said primary database server determining that said transaction has been committed;
   wherein the steps are performed by one or more computing devices.

2. The method of claim 1, further comprising:
   said primary database server transmitting via the forward channel a first set of log records;
   after transmitting said first set of log records, said primary database server transmitting via the forward channel a second set of log records;
   after transmitting said second set of log records, said primary database server receiving via the back channel an indication that the first set of log records has been stored persistently in said second persistent log.

3. A method for synchronizing a commit of a same transaction at both a primary database server and a secondary database server that replicates transactions made at the primary database server, comprising steps of:
   after storing log records recording changes made by said transactions persistently to a first persistent log of the primary database server, said primary database server transmitting said log records to said secondary database server for replication;
   said primary database server transmitting a commit record to said secondary database server;
   said primary database server receiving data from said secondary database server, the data identifying (a) a certain location, in a second persistent log of the secondary database server, where a last log record has been persistently stored by said secondary database server or (b) the last log record;
   determining that multiple transactions of said transactions has been committed based at least on the data;
   wherein the steps are performed by one or more computing devices.

4. The method of claim 3, further comprising:
   said primary database server transmitting a first set of log records;
   after transmitting said first set of log records, said primary database server transmitting a second set of log records;
   wherein said commit record is transmitted with the first set of log records or the second set of log records;
   after transmitting said second set of log records, said primary database server receiving data from said secondary database server, the data including the certain location in the second persistent log where said secondary database server has persistently stored the last log record.

5. The method of claim 3, wherein determining that the transaction has committed comprises determining that the certain location is beyond a corresponding location in the first persistent log where said commit record is stored.

6. A method for synchronizing updates to a same data block received at a secondary database server from instances of a primary database server running on two distinct nodes comprising:
   the secondary database server receiving from a first primary database instance one or more first log records recording a change to a particular data block including a synchronizing log record, and storing the one or more first log records to a first persistent log;
   wherein the synchronizing log record records dependency information representing a dependency of the one or more first log records stored in the first persistent log on a second log record recording a second change stored in a second persistent log;
   said secondary database server receiving a third log record recording a transaction commit to said particular data block;
   based at least in part on the dependency information recorded in the synchronizing log record stored in the first persistent log, determining that the dependency has not been met;
   in response to determining that the dependency has not been met, the secondary database server delaying notification that the transaction commit recorded in the third log record has committed;
   wherein the steps are performed by one or more computing devices.

7. The method of claim 6, wherein the synchronizing log record comprises identification information that may be used to identify the second persistent log.

8. The method of claim 6, wherein the synchronizing log record comprises a location within a primary redo log where the second log record recording the second change is stored.

9. The method of claim 6, wherein notification of a last redo record stored persistently in the first persistent log is generated only after particular redo records that are identified in the synchronizing log record are written to the second persistent log.

10. The method of claim 6, further comprising:
    determining to delay applying changes to data blocks based at least in part on the dependency information recorded in the synchronizing log record.

11. The method of claim 6, wherein changes to data blocks, identified by redo records written to the first persistent log, are applied only after particular redo records that are identified in the synchronizing log record are written to the second persistent log.

12. A method for synchronizing updates to a same data block made by two instances of a primary database server running on distinct nodes comprising:
    a first primary database server instance:

sending change log records to a secondary database server, the change log records representing changes made by the first primary database server instance to a particular data block;

wherein the secondary database server stores the changes persistently to a first persistent log;

sending, to a second primary database server instance, the particular data block and a synchronizing log record;

wherein the synchronizing log record contains at least information that is used to identify the first persistent log;

in response to receiving the particular data block and the synchronizing log record, the second primary database server instance sending the synchronizing log record to the secondary database server to be stored persistently in a second persistent log;

sending, to the secondary database server, change records that record changes made to the particular data block by the second primary database server instance;

wherein the steps are performed by one or more computing devices.

13. One or more non-transitory storage media storing instructions for synchronizing a commit of a same transaction at both a primary database server and a secondary database server that replicates transactions made at the primary database server, wherein the instructions, when executed by one or more processors, cause:

via a forward channel to said secondary database server, said primary database server transmitting, to said secondary database server for replication, log records recording changes made by said transactions;

said primary database server persistently storing in a first persistent log a commit record recording a commitment of a transaction of said transactions;

via said forward channel to said secondary database server, a first process executing at said primary database server transmitting said commit record to said secondary database server;

via a back channel that is different than said forward channel, a second process that is different than the first process and that is executing at said primary database server receiving, from the secondary database server, an indication that said secondary database server has persistently stored said commit record in a second persistent log;

in response to (1) receiving said indication that said secondary database server has persistently stored said commit record in said second persistent log and (2) said primary database server persistently storing said commit record in the first persistent log, said primary database server determining that said transaction has been committed.

14. The one or more non-transitory storage media of claim 13, wherein the instructions further include instructions for:

said primary database server transmitting via the forward channel a first set of log records;

after transmitting said first set of log records, said primary database server transmitting via the forward channel a second set of log records;

after transmitting said second set of log records, said primary database server receiving via the back channel an indication that the first set of log records has been stored persistently in said second persistent log.

15. One or more non-transitory storage media storing instructions for synchronizing a commit of a same transaction at both a primary database server and a secondary database server that replicates transactions made at the primary database server, wherein the instructions, when executed by one or more processors, cause:

after storing log records recording changes made by said transactions persistently to a first persistent log of the primary database server, said primary database server transmitting said log records to said secondary database server for replication;

said primary database server transmitting a commit record to said secondary database server;

said primary database server receiving data from said secondary database server, the data identifying (a) a certain location, in a second persistent log of the secondary database server, where a last log record has been persistently stored by said secondary database server or (b) the last log record;

determining that multiple transactions of said transactions has been committed based at least on the data.

16. The one or more non-transitory storage media of claim 15, wherein the instructions further include instructions for:

said primary database server transmitting a first set of log records;

after transmitting said first set of log records, said primary database server transmitting a second set of log records;

wherein said commit record is transmitted with the first set of log records or the second set of log records;

after transmitting said second set of log records, said primary database server receiving data from said secondary database server, the data including the certain location in the second persistent log where said secondary database server has persistently stored the last log record.

17. The one or more non-transitory storage media of claim 15, wherein determining that the transaction has committed comprises determining that the certain location is beyond a corresponding location in the first persistent log where said commit record is stored.

18. One or more non-transitory storage media storing instructions for synchronizing updates to a same data block received at a secondary database server from instances of a primary database server running on two distinct nodes, wherein the instructions, when executed by the one or more processors, cause:

the secondary database server receiving from a first primary database instance one or more first log records recording a change to a particular data block including a synchronizing log record, and storing the one or more first log records to a first persistent log;

wherein the synchronizing log record records dependency information representing a dependency of the one or more first log records stored in the first persistent log on a second log record recording a second change stored in a second persistent log;

said secondary database server receiving a third log record recording a transaction commit to said particular data block;

based at least in part on the dependency information recorded in the synchronizing log record stored in the first persistent log, determining that the dependency has not been met;

in response to determining that the dependency has not been met, the secondary database server delaying notification that the transaction commit recorded in the third log record has committed.

19. The one or more non-transitory storage media of claim 18, wherein the synchronizing log record comprises identification information that may be used to identify the second persistent log.

20. The one or more non-transitory storage media of claim 18, wherein the synchronizing log record comprises a location within a primary redo log where the second log record recording the second change is stored.

21. The one or more non-transitory storage media of claim 18, wherein notification of a last redo record stored persistently in the first persistent log is generated only after particular redo records that are identified in the synchronizing log record are written to the second persistent log.

22. The one or more non-transitory storage media of claim 18, wherein the instructions further include instruction for:
determining to delay applying changes to data blocks based at least in part on the dependency information recorded in the synchronizing log record.

23. The one or more non-transitory storage media of claim 18, wherein changes to data blocks, identified by redo records written to the first persistent log, are applied only after particular redo records that are identified in the synchronizing log record are written to the second persistent log.

24. One or more non-transitory storage media storing instructions for synchronizing updates to a same data block made by two instances of a primary database server running on distinct nodes, wherein the instructions, when executed by one or more processors, cause:

a first primary database server instance:
sending change log records to a secondary database server, the change log records representing changes made by the first primary database server instance to a particular data block;
wherein the secondary database server stores the changes persistently to a first persistent log;
sending, to a second primary database server instance, the particular data block and a synchronizing log record;
wherein the synchronizing log record contains at least information that is used to identify the first persistent log;
in response to receiving the particular data block and the synchronizing log record, the second primary database server instance sending the synchronizing log record to the secondary database server to be stored persistently in a second persistent log;
sending, to the secondary database server, change records that record changes made to the particular data block by the second primary database server instance.

* * * * *

UNITED STATES PATENT AND TRADEMARK OFFICE
CERTIFICATE OF CORRECTION

PATENT NO. : 8,868,492 B2  
APPLICATION NO. : 13/161315  
DATED : October 21, 2014  
INVENTOR(S) : Garin, Jr. et al.

Page 1 of 1

It is certified that error appears in the above-identified patent and that said Letters Patent is hereby corrected as shown below:

Title Page, Item (54), line 2, and in the Specification at Column 1, line 2, under Title, delete "Transactions" and insert -- Transaction --, therefor.

Signed and Sealed this  
Twenty-third Day of February, 2016

Michelle K. Lee  
*Director of the United States Patent and Trademark Office*